United States Patent [19]

Yasutake

[11] Patent Number: 5,086,904
[45] Date of Patent: Feb. 11, 1992

[54] PART SUPPLY ARRANGEMENT

[75] Inventor: Masanori Yasutake, Hirakata, Japan

[73] Assignee: Matsushita Electric Industrial Co., Ltd., Osaka, Japan

[21] Appl. No.: 600,805

[22] Filed: Oct. 22, 1990

[30] Foreign Application Priority Data

Oct. 20, 1989 [JP] Japan .................. 1-274099

[51] Int. Cl.⁵ ............................ B65G 37/00
[52] U.S. Cl. ................ 198/346.1; 198/346.2; 198/619
[58] Field of Search ............. 198/619, 346.1, 346.2; 104/31, 130.1, 48

[56] References Cited

U.S. PATENT DOCUMENTS

| 2,976,817 | 3/1961 | Stapp ..................... 104/48 |
| 3,556,011 | 1/1971 | Saxonmeyer ............. 104/48 |
| 3,861,320 | 1/1975 | Licthenberg ............ 104/130.1 |
| 3,905,302 | 9/1975 | Fink et al. ............... 104/130.1 |
| 3,913,492 | 10/1975 | Düll ....................... 104/130.1 |
| 4,704,792 | 11/1987 | Itagaki et al. ............ 198/619 X |
| 4,718,533 | 1/1988 | Nussbaumer et al. .... 198/346.1 |

FOREIGN PATENT DOCUMENTS

| 0121136 | 6/1987 | Japan ..................... 198/619 |
| 0218043 | 9/1987 | Japan ..................... 198/346.2 |

Primary Examiner—D. Glenn Dayoan
Attorney, Agent, or Firm—Wenderoth, Lind & Ponack

[57] ABSTRACT

A part supply arrangement which includes a part transporting table device and a part feeding table device of an automatic part mounting unit which are respectively constituted by first and second stationary portions of a brushless DC linear motor, a carrier device on which a part unit to be transported is placed, and which is constituted by a movable portion of the brushless DC linear motor so as to be transported along a transport path, and a change-over device for changing-over connection of the stationary portions with respect to the transport path for the carrier device.

2 Claims, 2 Drawing Sheets

PART SUPPLY ARRANGEMENT

BACKGROUND OF THE INVENTION

The present invention generally relates to a supply arrangement, and more particularly, to a part supply arrangement for transporting parts or components to be fed into automatic part mounting machines installed in a factory at high speeds and positioning with high accuracy.

Conventionally, for supplying parts or components into an automatic part mounting machine (referred to merely as a mounting machine hereinafter), it has been a general practice to shut down the mounting machine when the parts are used up so as to manually exchange part units or to transport such part units to a position close to the mounting machine by an automatic transport vehicle or a belt conveyor, thereby loading the part unit onto the mounting machine either manually or by an industrial robot.

However, in the conventional practice as described above which relies on man power, not only is much time is taken for the exchange, but mis-handling, etc. tends to take place, thus making it difficult to introduce automization on the whole. Furthermore, there has also been a problem that providing another mechanism between the automatic transport vehicle such as an industrial robot and the mounting machine to effect the automization undesirably complicates the arrangement, with a consequent rise in cost for the entire installation.

SUMMARY OF THE INVENTION

Accordingly, an essential object of the present invention is to provide a part supply arrangement which is capable of automatically transporting parts for automatic part mounting machines at high speeds and positioning with high accuracy.

Another object of the present invention is to provide a part supply arrangement of the above described type which is simple in construction and stable in functioning with high reliability, and can be readily introduced into automatic production lines at low cost.

In accomplishing these and other objects, according to one preferred embodiment of the present invention, there is provided a part supply arrangement which includes a part transporting table means and a part feeding table means of an automatic part mounting means which are disposed in a parallel relation to each other and respectively constituted by first and second stationary portions of a magnet movable type brushless DC linear motor capable of moving its movable portion at high speeds and with high accuracy, a carrier means on which a part unit to be transported is placed, and which is constituted by the movable portion of said brushless DC linear motor so as to be transported along a transport path, and a change-over means for changing-over connection of the stationary portions with respect to the transport path for the carrier means.

By the above construction according to the present invention, it becomes possible to exchange the part units by connecting the second stationary portion for the part feeding table to the carrier transport path, and when said second stationary portion is to be caused to function as the part feeding table, the first stationary portion for the part transport table can be connected to the transport path. Thus, the whole arrangement can be controlled in an efficient manner even in the case where a plurality of mounting machines are to be coupled with each other.

BRIEF DESCRIPTION OF THE DRAWINGS

These and other objects and features of the present invention will become apparent from the following description of a preferred embodiment thereof with reference to the accompanying drawings, in which.

DETAILED DESCRIPTION OF THE INVENTION

Figure 1:
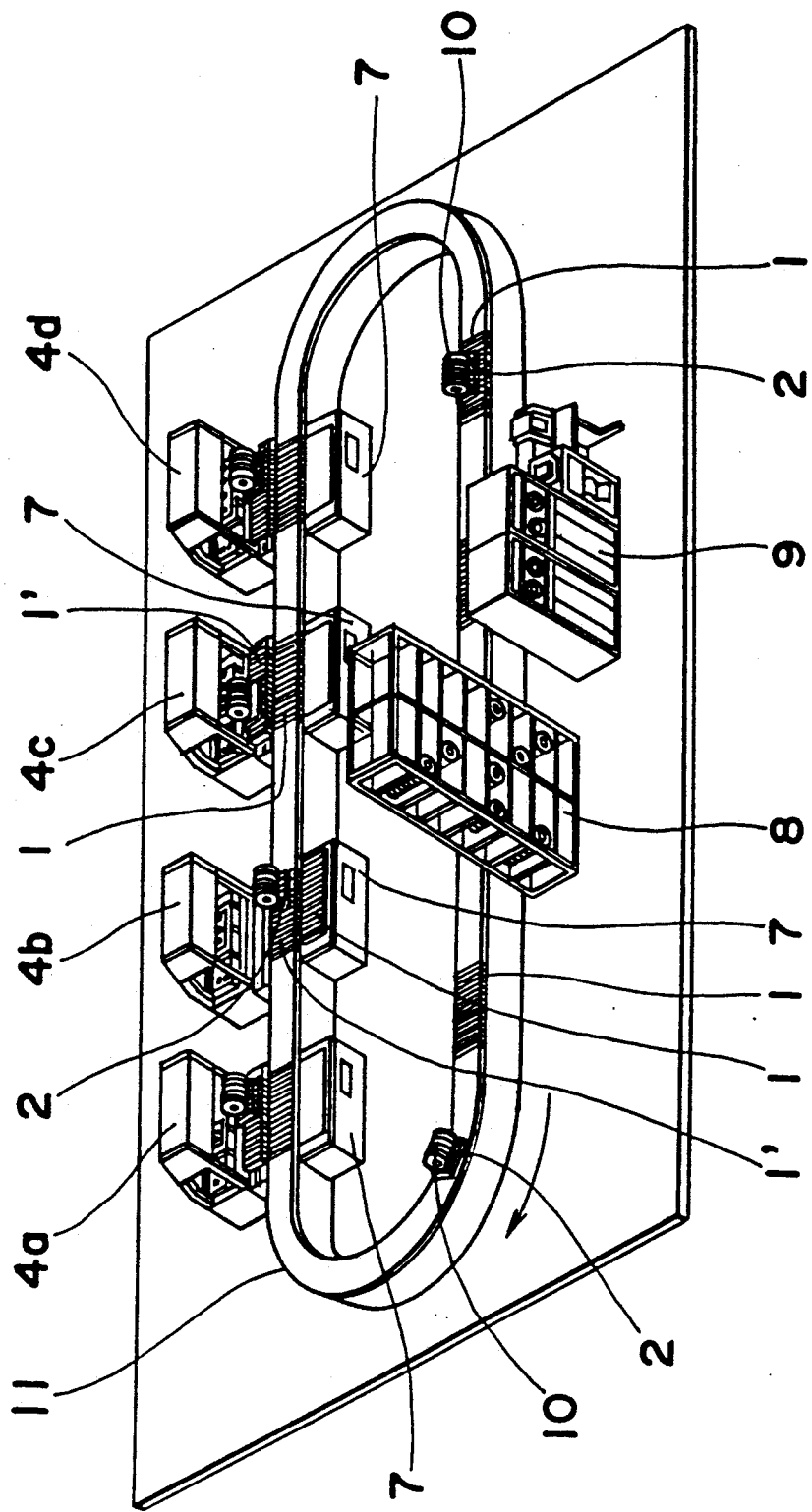
FIG. 1 is a perspective view showing an entire system of a part supply arrangement according to one preferred embodiment of the present invention.

Before the description of the present invention proceeds, it is to be noted that like parts are designated by like reference numerals throughout the accompanying drawings.

Referring now to the drawings, there is shown in FIG. 1, an overall construction of a part supply arrangement according to one preferred embodiment of the present invention, which generally includes a transport path 11 for transporting carriers 2 on which part lots or part units 10 are placed, in a direction indicated by an arrow, and a plurality of, for example, four part mounting machines 4a,4b,4c and 4d provided along said transport path 11 as illustrated. FIG. 1 shows the state where a second stationary portion 1, of a magnet movable type brushless DC linear motor (referred to as a DL motor hereinafter) constituting a part feeding table is connected to the transport path 11 when the parts for the part mounting machine 4b have been used up. An the above state, the second stationary portion 1, for the part feeding table stands-by until the part lot 10 is transported thereto from a part storage 8 by the carrier 2 constituted by a magnet movable portion of the DL motor. Upon arrival of the carrier 2 carrying the part lot 10 thereon at the second stationary portion 1, for the part mounting machine 4b, said second stationary portion 1', and a first stationary portion 1 of the DL motor which constitutes a part transporting table are subjected to a parallel displacement so that said second stationary portion 1' functions as the part feeding table 1' of the mounting machine 4b, and said first stationary portion 1 functions as the part transporting table thereof to allow another carrier 2 to pass therethrough. The above state is represented by the positions taken by the first and second stationary portions 1 and 1' at part mounting machines 4a,4c and 4d. The first stationary portion 1 which functions as the part transporting table also functions to impart a thrust to the next part transporting table 1', to a subsequent carrier 2 upon arrival of such carrier 2 thereat.

Figure 2:
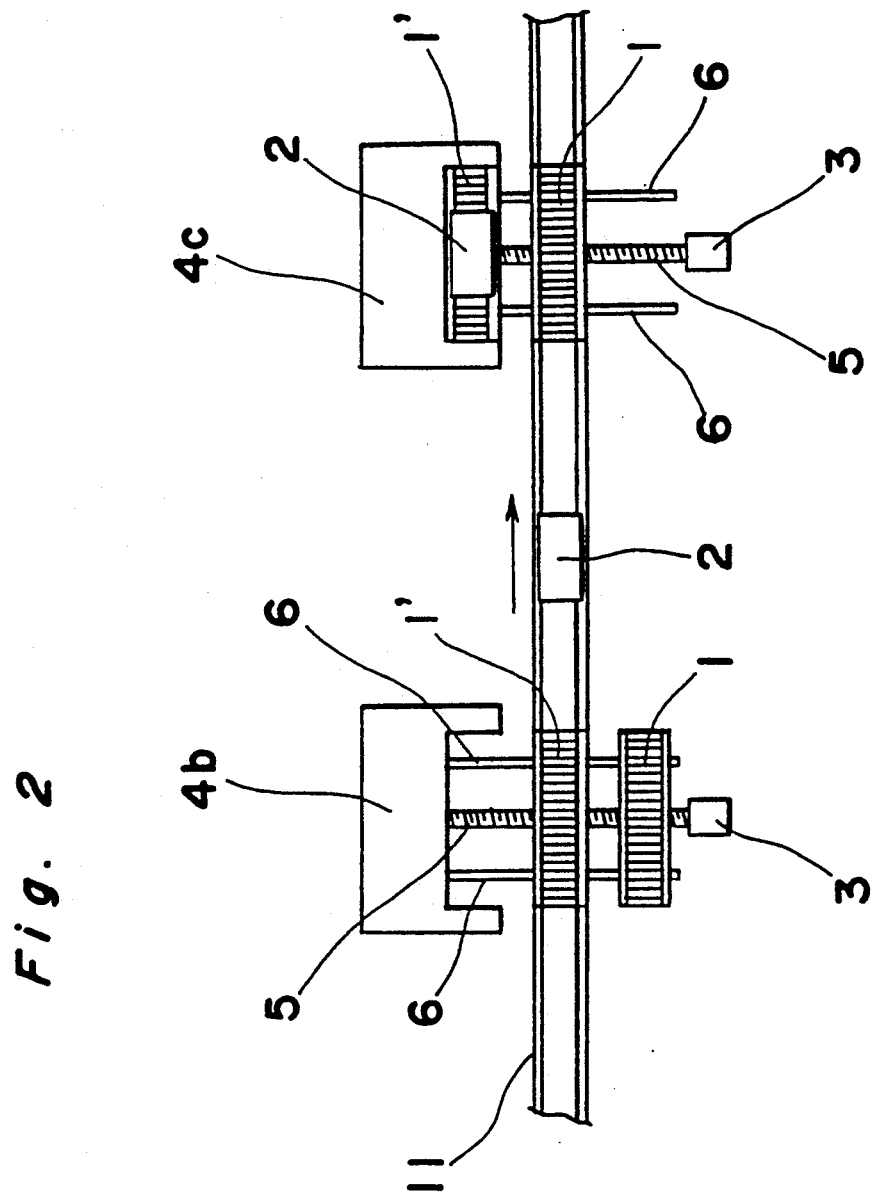
FIG. 2 is a fragmentary top plan view showing, on an enlarged scale, an essential portion of the part supply arrangement of FIG. 1 for explaining displacement of the stationary portions with respect to part mounting machines.

FIG. 2 shows one example of a mechanism for subjecting the first and second stationary portions 1 and 1', which function as the part transporting table 1 and the part feeding table 1', to the parallel displacement in association with each other.

In the construction of FIG. 2, the first and second stationary portions 1 and 1, are guided in a parallel relation to each other by two rods 6 provided at left and right sides thereof, while being held at a predetermined distance from each other by an adjusting screw 5 extending therethrough at an intermediate portion between the rods 6. The screw 5 is driven by a servo motor 3 coupled therewith, and driven and controlled by a control unit 7 of each of the mounting machines 4a to 4d. The respective stationary portions 1 and 1' are also controlled for the positioning functions, etc. by the control units 7, which are further controlled by a line computer 9 as shown in FIG. 1.

As is clear from the foregoing description, according to the present invention, by providing two stationary portions of the high speed and high accuracy brushless linear motor on the part mounting machine, it becomes possible to readily construct a system for the part supply arrangement capable of automatically and smoothly supplying parts to part mounting machines.

Although the present invention has been fully described by way of example with reference to the accompanying drawings, it is to be noted here that various changes and modifications will be apparent to those skilled in the art. Therefore, unless other wise such changes and modifications depart from the scope of the present invention, they should be construed as included therein.

What is claimed is:

1. A part supply arrangement comprising:
   a transport path having stationary parts of a D.C. brushless motor therealong and having at least one part feeding station therealong;
   carrier means having a part carrier unit thereon and being constituted by a movable part of a D.C. brushless motor and movable along said transport path by the interaction with said stationary parts;
   one of said stationary parts being positioned at said part feeding station and being shaped for movement laterally of said transport path into an automatic part mounting apparatus as a part feeding table thereof, said one of said stationary parts being movable laterally out of said transport path into an automatic part mounting apparatus;
   a transporting table means constituting a transport path replacement part and being constituted by a stationary part of a D.C. brushless motor and being positioned in spaced parallel relation to said one of said stationary parts; and
   changeover means connected to said one of said stationary parts and said transporting table means for, upon arrival of a carrier unit with a part carrier unit thereon at said one of said stationary parts, simultaneously moving said one of said stationary parts into an automatic part mounting apparatus and moving said transporting table means into said transport path to replace said one of said stationary parts and to function to drive other carrier units past said part feeding station in place of said one of said stationary parts.

2. A part supply arrangement as claimed in claim 1 in which said changeover means comprises a parallel displacement mechanism including a rod means on which said one of said stationary parts and said transporting table means are slidably mounted for being guided during movement thereof, and a screw means on which said one of said stationary parts and said transporting table means are threadedly mounted for holding said one of said stationary parts and said transporting table means at a predetermined spacing, a servo motor connected to said screw means for driving said screw means for simultaneously moving said one of said stationary parts and said transporting table means, and a control unit for the automatic part mounting apparatus connected to said servo motor for operating said servo motor in synchronization with the automatic part mounting apparatus.

* * * * *